UNITED STATES PATENT OFFICE.

JOHN H. KELLOGG, OF BATTLE CREEK, MICHIGAN.

CEREAL COFFEE OR COFFEE SUBSTITUTE.

1,069,265.   Specification of Letters Patent.   Patented Aug. 5, 1913.

No Drawing.   Application filed May 20, 1912.   Serial No. 698,585.

*To all whom it may concern:*

Be it known that I, JOHN H. KELLOGG, a citizen of the United States, residing at the city of Battle Creek, county of Calhoun, and State of Michigan, have invented certain new and useful Improvements in Cereal Coffee or Coffee Substitutes, of which the following is a specification.

This invention relates to improvements in cereal coffee or coffee substitutes.

The object of this invention is to provide a cereal coffee which is easily prepared and one by which the beverage is prepared for immediate use merely by adding hot water to the preparation.

In carrying out my invention, I prefer to employ a cereal coffee produced by combining malted cereals such as malted wheat, barley, or rye, and barley sprouts, with bran and unmalted wheat, rye, and barley, and roast the whole together. The proportions are preferably about as follows: To a mixture containing about equal parts of bran, wheat, rye, and barley, I add from five to ten per cent. of malt and preferably a percentage of barley sprouts. The malt is added for the purpose of liquefying the starch more completely. It also affects to some extent the flavor. The barley sprouts are added mainly on account of the effect on the flavor. A single grain may be used with quite satisfactory results, that is, either wheat, barley, or rye may be combined with about ten per cent. malt, but I preferably use the combination of the cereals stated. The barley is added to about one-third of the cereals (wheat, rye, barley or other grain) with water after first cooking the grain, then digested until the starch is liquefied. The balance of the ingredients are then added.

The mixture is thoroughly roasted or baked. This roasted mixture is boiled to extract the soluble matter, the boiling being carried on for from half an hour to an hour, according to conditions. It is desirable to boil for a considerable period until substantially all the soluble matter has been extracted. The liquor is then extracted from the insoluble matter and concentrated or evaporated to a syrup like consistency.

The insoluble matter from which the extract is made, is dried and about one-half of this residue, more or less, is mixed with the concentrated extract or syrup and dried and coarsely ground, the object of the grinding being to break up the material which may have adhered together in more or less of a mass unless great care has been taken in the drying. The extract is thoroughly mixed with the granular residue so that the surfaces of the insoluble granular material are coated with the extract in soluble form and is ready for solution and dissolves at once when brought into contact with boiling water. Sugar may be added to the extract if desired in such quantities that the final product is suitable for use without the addition of more sugar. Sweetened coffee is, however, objectionable to some and the product is satisfactory without the addition of the sugar and the sugar may be added at the time of serving as in ordinary coffee if desired.

Instead of using the dried grounds or residue from which the extract is made, the extract may be combined with a quantity of the material such as is used in preparing the extract or other granulated material. Instead of the particular ingredients I describe for preparation of the extract, cereal coffee of the character now on the market may be used with quite satisfactory results. For instance, the product known on the market as "Caramel cereal" may be used, this being boiled to extract the soluble matter and otherwise treated as above stated.

The generic idea of coating any suitable material with cereal coffee liquor is not claimed herein but forms the subject matter of my co-pending application, Serial No. 698,586, filed May 20, 1912.

The condensed or evaporated extract or liquor being on the surface of the granules is very quickly and thoroughly dissolved merely by the addition of hot water so that the beverage is very easily prepared from the product. The product may be used without drying, but in order to be kept successfully and without preparation, it should be thoroughly dried when it may be kept for a long period, without material loss of strength and has the granular appearance of coffee.

The condensing or evaporation of the liquor drives off certain volatile acids which are produced by the roasting step so that the final beverage or product is superior, in my opinion, by being largely freed from these objectionable acids, to the beverage prepared by the boiling of a quantity of the so-called cereal coffee and is superior to the extract or decoction made by boiling the roasted mixture described previous to its being concentrated.

Having thus described my invention, what I claim as new and desire to secure by Letters Patent is:

1. The process of manufacturing cereal coffee consisting in boiling cereal coffee, extracting the liquor thus obtained, and mixing cereal coffee with the extract to form a coating thereof upon the surfaces of the cereal coffee.

2. The process of manufacturing cereal coffee consisting in boiling cereal coffee, extracting the liquor and concentrating the same, and mixing the extract with cereal coffee to form a coating on the surfaces thereof.

3. The process of manufacturing cereal coffee consisting in boiling cereal coffee, extracting the liquor and concentrating the same, mixing the extract with cereal coffee to form a coating on the surfaces thereof, and drying.

4. The process of manufacturing cereal coffee consisting of boiling cereal coffee, extracting the liquor and evaporating it to a syrup-like consistency, combining sugar therewith, and mixing cereal coffee with the extract to form a coating on the surface thereof.

5. The process of manufacturing cereal coffee consisting of boiling cereal coffee, extracting the liquor and evaporating it to a syrup-like consistency, and mixing cereal coffee with the extract to form a coating upon the surface thereof.

6. The process of manufacturing cereal coffee consisting in boiling cereal coffee, extracting the liquor and evaporating it to a syrup-like consistency, mixing cereal coffee with the extract to form a coating on the surface thereof, and drying.

7. The process of preparing cereal coffee consisting of boiling cereal coffee, extracting the liquor and evaporating it to a syrup-like consistency, combining sugar therewith and mixing cereal coffee in granular form with the syrup to coat the surface of the granules with the syrup.

8. The process of preparing cereal coffee consisting of boiling cereal coffee, extracting the liquor and evaporating it to a syrup-like consistency, and mixing cereal coffee in granular form with the extract to coat the surfaces of the granules with the extract.

9. The process of preparing cereal coffee consisting of boiling cereal coffee, extracting the liquor and evaporating it to a syrup-like consistency, mixing cereal coffee in granular form with the extract to coat the surfaces of the granules with the extract, and drying.

10. A coffee substitute consisting of cereal coffee coated with a syrup consisting of evaporated cereal coffee liquor and sugar.

11. A coffee substitute consisting of cereal coffee coated with an extract consisting of evaporated cereal coffee liquor.

12. A coffee substitute consisting of cereal coffee in granular form, the granules of which are coated with a syrup consisting of evaporated cereal coffee liquor and sugar.

13. A coffee substitute consisting of cereal coffee in granular form, the granules of which are coated with a syrup consisting of evaporated cereal coffee liquor.

In witness whereof, I have hereunto set my hand and seal in the presence of two witnesses.

JOHN H. KELLOGG. [L. S.]

Witnesses:
JESSE ARTHUR,
ROBERT C. LUDLUM.